US010842238B2

(12) United States Patent
Gandhi et al.

(10) Patent No.: US 10,842,238 B2
(45) Date of Patent: Nov. 24, 2020

(54) ELECTRONIC DEVICE ENCASEMENT WHICH STORES AND PRESENTS DATA CARDS

(71) Applicant: FELLOWES MOBILE LLC, Itasca, IL (US)

(72) Inventors: Harsh Gandhi, Palatine, IL (US); Benjamin MacBeth, Elmhurst, IL (US); Jeffrey Lienemann, Chicago, IL (US); Richard Kang, Elgin, IL (US); Tai Hoon K. Matlin, Round Lake Beach, IL (US); Steve Carson, River Forest, IL (US)

(73) Assignee: Fellowes Mobile LLC, Itasca, IL (US)

( * ) Notice: Subject to any disclaimer, the term of this patent is extended or adjusted under 35 U.S.C. 154(b) by 0 days.

(21) Appl. No.: 16/370,326

(22) Filed: Mar. 29, 2019

(65) Prior Publication Data

US 2019/0298024 A1   Oct. 3, 2019

Related U.S. Application Data

(60) Provisional application No. 62/650,046, filed on Mar. 29, 2018.

(51) Int. Cl.
| | |
|---|---|
| *H04B 1/38* | (2015.01) |
| *A45C 11/18* | (2006.01) |
| *A45C 13/02* | (2006.01) |
| *A45C 11/00* | (2006.01) |

(52) U.S. Cl.
CPC ............ *A45C 11/182* (2013.01); *A45C 13/02* (2013.01); *A45C 2011/002* (2013.01)

(58) Field of Classification Search
CPC ..... H04B 1/3883; H04B 1/03; H04M 1/0206; H04M 1/0208; H04M 1/815; A45C 11/182; A45C 13/002
See application file for complete search history.

(56) References Cited

U.S. PATENT DOCUMENTS

| | | | |
|---|---|---|---|
| 8,267,251 B2 | 9/2012 | Mongan et al. | |
| 8,418,852 B2 | 4/2013 | Ziemba | |
| 8,989,826 B1 | 3/2015 | Connolly | |
| 2011/0256024 A1* | 10/2011 | Cole ................... | A61B 5/0022 422/68.1 |
| 2016/0113368 A1* | 4/2016 | Tu ....................... | H04B 1/3888 206/45.23 |

* cited by examiner

*Primary Examiner* — Tuan Pham
(74) *Attorney, Agent, or Firm* — Wood, Phillips, Katz, Clark & Mortimer

(57) ABSTRACT

Disclosed herein is an electronic device encasement which not only encases and protects the electronic device, it allows for storage and presentation of one or more data cards. As the encasement device operator initiates access to the stored data card by opening a protective storage cover, the accessing action initiates a subsequent mechanical response which presents the card by a separating action from the encasement and the other possible stored items, as to allow for easier access and use of the one or more data cards. The storage and presentment mechanisms include a plurality of pockets, grips, and other structures to secure and present the cards.

8 Claims, 5 Drawing Sheets

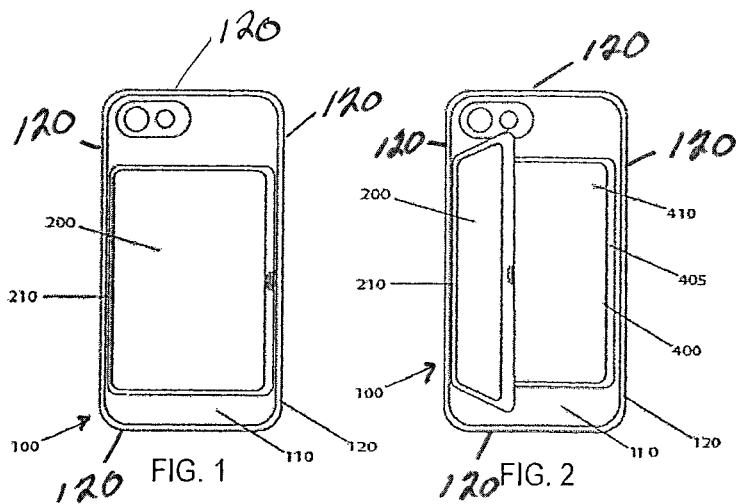
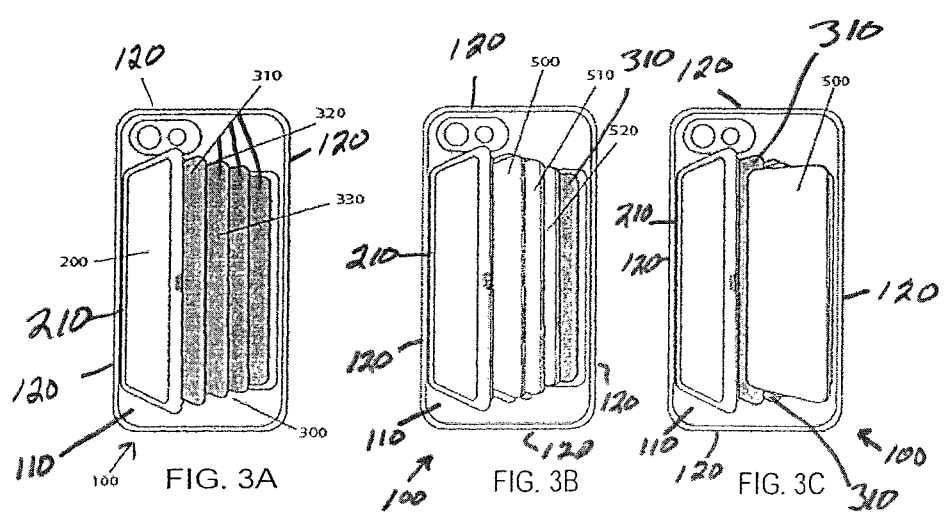
FIG. 1  FIG. 2  FIG. 3A  FIG. 3B  FIG. 3C

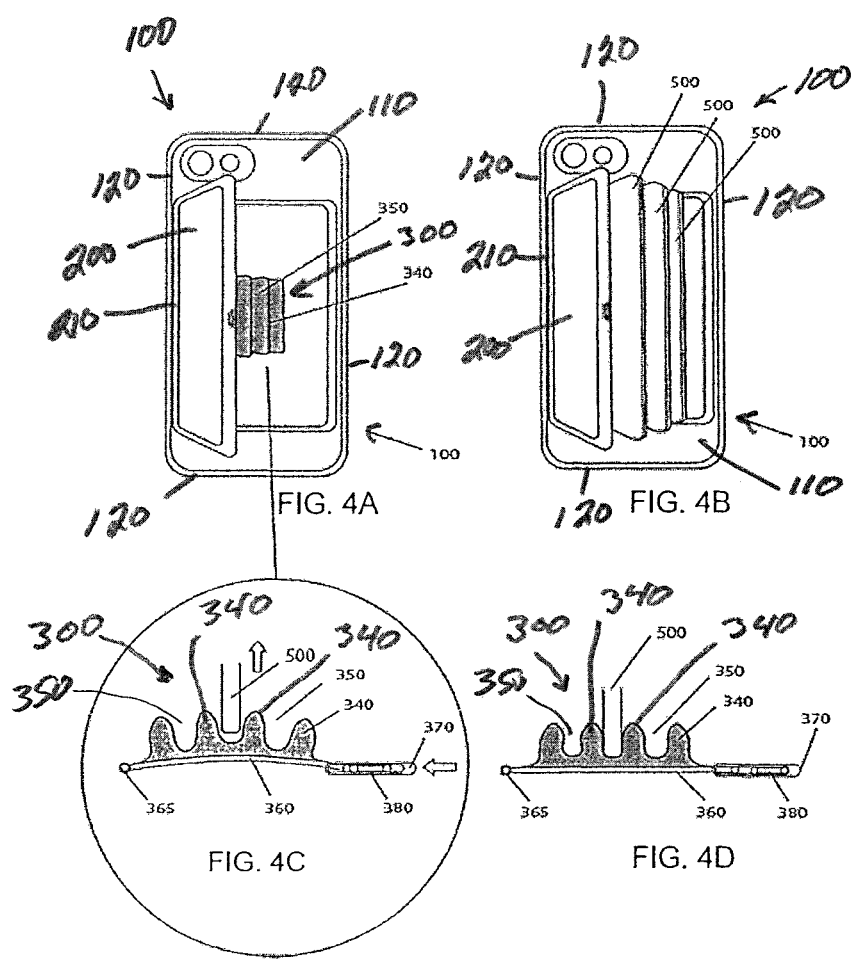

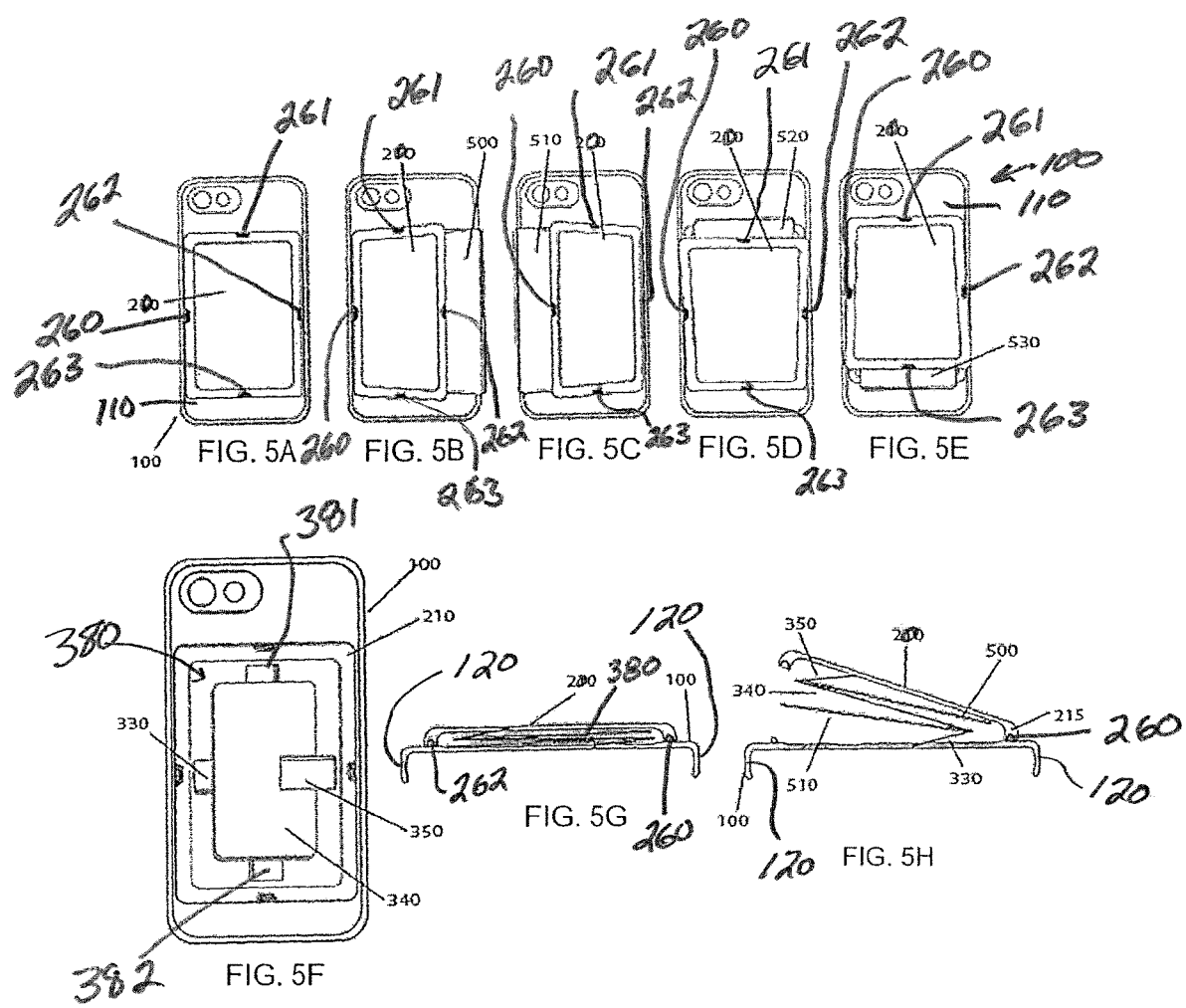

ELECTRONIC DEVICE ENCASEMENT WHICH STORES AND PRESENTS DATA CARDS

BACKGROUND OF THE INVENTION

Field of the Invention

The present patent application relates to a protective functional case used with portable electronic devices. More specifically, the application relates to a case which is configured to store one or more data cards, allow access to them in a way as to present the card to enhance ease of access and ease of use of the one or more data cards.

Background Art

Electronic device encasements have been around for many years, and many of them have supplemental features beyond the protective nature of the encasement, such as mounting features, LED lights, expansion of memory, and power and so on. The category of supplemental features of this application are the additional storage and organizational features provided to store or protect items other than the portable electronic device, such as data cards. As the frequent use and need to access electronic devices in our everyday lives increases, the placement of these devices competes with other important items needed frequent access such as billfolds, money clips, wallets, and or other items traditionally carried in purses, bags, cases, and pockets. Due to these observations, some encasement and folio products of the prior art have included supplemental storage functions which combine a protective encasement for the electronic device with supplemental storage to minimize the need to carry multiple items.

U.S. Pat. No. 8,418,852 is an example claiming a compartmentalized protective case for portable handheld device, including a compartment for housing the electronic device and a second compartment configured for receiving and housing personal items. The second compartment and compartment for the device are piggybacked upon one another. The second compartment is enclosed with a hinged storage cover with an open bottom side, which the open bottom side when hinged closed, becomes a storage cover for the mobile device. This prior art does not offer any feature or structure to hold, cradle, display, separate, or provide any manipulation of the articles stored within.

U.S. Pat. No. 8,267,251 is an example of a one-piece case which encloses a personal electronics device comprising a flexible inner layer and a hard-exterior layer being sufficiently flexible as to deform and accept the insertion of the personal electronic device with the flexible inner layer creating a second fitted cavity configured to accept and retain at least one card through an opening on the side surface of the case. While the flexible nature of this prior art allows the case to better secure the item stored therein, it does nothing to separate, manipulate, or otherwise aid the user in selecting among the items stored therein.

In addition, there have been folio products in the market today which hold mobile electronic devices, the folios hinging or folding open to expose the mobile electronic device. Rather than including a compartment to store things such as data cads, the interior surface of the folio includes a slotted arrangement or pockets which retain and hold cards within. The devices have the same problems or shortcomings discussed above.

Additionally, the devices of the prior art either retain the cards and items stored within too loosely as to not functionally hold, divide and secure them properly or they hold and retain the cards and items too tightly as to make it difficult to load or access the retained items having undesirable effects. The invention disclosed herein includes improvements and additional features to electronic device encasements which store data cards.

SUMMARY OF THE INVENTION

Disclosed herein is an electronic device encasement which stores and presents data cards is such a way as to over-come many of the limitations in the current product offerings in the market, while improving upon the prior art as well. As this category of products matures, there are many types of electronic device encasements with some sort of supplemental storage built in available for purchase. For many reasons, these products tend to struggle and under-perform when balancing easy accessibility and convenience of the stored item, such as an electronic data card with the need to secure the item within the storage and holding device as to not dislodge the card or other stored item. Due to the valuable nature of certain items such as data cards including, but not limited to credit cards or ID cards, the card retention device may use a retention method that is non-variable and stays constant; typically, either too lose as to not retain and secure the data card with confidence for the ones piece of mind, or retains the data card too tightly, as to make the egress and ingress of the data card too difficult and cumbersome as to reach the level of being annoyingly nonfunctional. The disclosed invention endeavors to overcome this issue and discloses a solution, amongst other things which varies the securing force and methodology for retaining the data card in place when access to the storage area is closed and when open, to presenting the card to the operator in such a way to be easily accessible.

In one embodiment, the disclosed invention includes a main encasement body having a back wall and side walls with holding elements extending therefrom as to form an opening which receives and retains an electronic device such as a mobile communications device. The embodiment further includes a movably connected wall or storage cover on the exterior of the case body which provides at least part of the exterior surface of the encasement storage covering a storage area within the encasement assembly. The movable connected storage cover in this embodiment is hinged, but in others can be slid, rotated, pivoted or multi hinged and unhinged to name a few connection methods, in such a way as to move the storage cover to expose a storage opening. The action of opening the movably connected storage cover to gain access to the storage area may actuate a mechanical element or a series of sequential elements which in turn separates and or presents the single card or item from the additionally stored cards or items. This separating and presenting action allows the stored card or item to be easily gripped by the operator's fingers and removed from the mechanical element.

In other embodiments, the mechanical element can be a pocket like structure of composed of vinyl or similarly thin material constructed with front and back portions with folded sides of which the back portion of the pocket like structure is connectedly attached to a non-moving and optionally shared inner wall of the encasement and the front of the pocket structure is connectedly attached or optionally can be the interior facing surface of the movably connected storage cover in such a way that actuating as to open to gain access to the storage area, unfolds, expanding the formerly compressed pocket like structure's side walls. The unfolding and expanding action, separates, presents and then releases the firmly held card or item from its secured position within the storage area in such a manner as to make it easy for the user's fingers to grip and remove the card or item from the pocket like structure; this action then can be reversed whereas one can actuate the moveably connected storage cover (opening to gain access to the storage area), take the card or item to be stored and place it into an available expanded and uncompressed pocket, then in a closing action, the moveably connected storage cover in turn collapses or compresses the pocket like structure as to retain the card or stored item securely as one fully closes the movably connected storage cover. Optionally an additional elastic element interwoven with the pocket element can create an additional lifting action to raise the data cards up within the separated pockets. This action is accomplished when the movably attached cover is opened taking up any slack within the elastic element and due to the intertwined assembly with the pocket like elements, the card is lifted within the pockets as the elastic is in the stretched position.

In another embodiment, the pocket like divider elements can be replaced by an elastomeric element made from a molded synthetic rubber, urethane, or other elastic material. This element in its non-compressed state would have retaining fingers which would hold at least one data card or stored element securely in place. The opening action of the movably connected storage cover actuates a mechanical arm which compresses the elastomeric element allowing it to take a flexed alternative position. In the flexed position, the retaining fingers are now spread upwardly and openly as to relax the elastomeric grip on the data card or stored item in a presenting manner or position. This at least secondary position allows the stored and retained card or stored item to be easily gripped by one's fingers and easily removed from the retaining elastomeric finger elements within the storage portion of the encasement. In the inverse actions, at least one data card or item to be stored can be inserted easily into the retaining finger elements when the movably connected wall or storage cover is in its open state and once closed, the cards or stored items are again held securely in place when the elastomeric retainer returns to its non-flexed position.

In alternative embodiments, the movably connected cover can be configured to be opened from at least two sides or more with each access point allowing direct access to a given pocket which separates and presents each card or purposefully grouped cards or stored items individually or in the subdivided groupings in a manner that one can decide which card or stored items should be accessed and used in an as needed basis.

In another embodiment, moveably connected cover is pivotably connected to the encasement as to pivot open and closed. The action of pivotably opening the moveably connected cover sequentially fans out and presents the data card or cards or stored items in a way as to make the easily accessible removeable with one's fingers. In an inverse action, one can insert a card or cards or stored items into the fanned-out retainer element and the closing action then collapses the fanned-out card, cards or stored items sequentially as to allow the movably attached cover to go into the closed position securing the stored elements within.

Another embodiment utilizes a movably connected sliding storage cover. The sliding action actuates a mechanism which separates and presents the stored card, cards or items in a manner as to make them easily accessible by one's fingers. Additionally, a mechanism such as a double rack and pinion can magnify the separation and presentation of a primary card as to allow for the card to be inserted into or slid through a credit card machine without having to remove the card from the storage or holding area of the encasement.

In other embodiments, the closing action of the moveably attached storage cover element can be registered by a firm detent, push button latching, or other similarly well-known closure mechanisms. The closure when the movably attached storage cover is in the closed position can be sealed as to repel foreign objects like dust, sand, and liquids from penetrating into the storage area. When waterproofing the storage area, the inner shared wall of the encasement device may be sealed and waterproofed or be constructed as solid wall or unitary well to receive articles and other structures as described herein.

In other embodiments, the moveably attached storage cover can be constructed with a segmented portion which is also movably attached to the cover as to allow for direct access to another segmented storage area. The additionally moveably attached segmented cover could also be used as a kickstand, to hold the encasement device at optional viewing angle or angles.

In some embodiments, the moveable storage cover could have additional or multiple registration and or detents to hold the cover open at such angles as to become a kick stand element as well. An additional elastic retainer may be used to keep the cards from falling out of the storage area when using the movable cover as a kickstand. Additionally, the additional elastic element can be located within the storage area or on the inner cover wall as to function as a money clip, or additional card or item storage function; the elastic loop can also be inverted and wrapped around the cover as to be exposed when the cover is closed to create an additional holding element outside the storage cavity. This loop can also be used as a supplemental finger hold for larger device encasements. Optionally, the moveably attached storage cover can also be used as a supplemental finger grip.

In some embodiments, the storage cavity and movably connected cover elements can also be moved pivotably or slid-ably out of the way and or removably detached entirely as to allow the encased electronic device to be set upon a wireless charging device as to couple the transmitting and receiving attendees at the proper efficiently operational distance and or to create a slimmer encasement when the storage feature is not in use. Additional specialized storage compartments can then be removably attached to the encasement device or to the phone directly. In an alternative arrangement, the wireless charging receiving antenna can be in a form of a card which can be then stored nearest to the moveably attached cover and connected to the charging port of the electronic device as to allow the antenna to be coupled more efficiently to the wireless charging transmitting device.

In another embodiment, the movably connected cover can be retained in the closed position by a latch or locking mechanism. The locking mechanism can be a powered latch which optionally can be actuated by the encased electronic device by direct wired communication utilizing a wired connector inserted into the communication and or power port or alternatively, wirelessly controlled by Bluetooth or NFC means with the latching action being actuated by a mobile application or App. When the feature is activated wirelessly, the latching mechanism is to be self-powered by a battery and operated through a controller which would have enough processing power to retain a user selectable combination which activates the latching mechanism.

The storage element with movably attached cover with and without the dividing elements and features disclosed in this application can be utilized without the electronic device encasement portions. The storage features can be directly attached to an electronic device by snap, friction magnetic or by way of two-sided adhesive tape mounting methods to only name a few. Additionally, the disclosed elements can be utilized without a movably attached cover; the feature actuations be alternatively activated by gripping the first accessible stored card or item.

The disclosed inventive features of this application can be applied to a range of encasement products and supplemental storage devices. Although the present patent application has been described in detail for the purpose of illustration, it is understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of an embodiment can be combined with one or more features of any other embodiment.

In one form, the invention is directed to a case for a portable electronic device. The case has a back wall and a plurality of side walls for retaining the portable electronic device. The back wall includes a storage area. A cover is hingedly attached to the back wall to selectively cover the storage area. The storage area includes at least one pocket for receiving at least one data storage card. The pocket is defined by a pocket front wall and a pocket back wall connected by at least one side element.

In one form, the pocket front wall is connected to the cover and the pocket back wall is connected to the cover back wall. The pocket opens when the cover is opened.

In one form, the case has a plurality of pockets.

In one form, the plurality of pockets open to release when the cover is open.

In one form, the plurality of pockets collapse to grasp when the cover is closed.

In one form, the case further includes a pocket assembly having a plurality of pockets. Each pocket is defined by a pocket front wall, a pocket back wall, and at least one pocket side wall. The pocket assembly has a first pocket front wall attached to the case cover and a last pocket back wall attached to the case back wall.

In one form, the case has a back wall and a plurality of side walls for retaining the portable electronic device. The back wall includes a storage area and a cover hingedly attached to the back wall to selectively cover the storage area. The cover is attached to the back wall by a plurality of hinges. The hinges operate in different hinge planes.

In one form, the cover is rectangular having four perimeter sides. A hinge is included on each perimeter side.

In one form, the hinges are snap fit retaining hinges.

In one form, the case further includes a multi-pocket assembly. The assembly has a dividing wall attached to the case cover by a first tab on a first side of the dividing wall, and attached to the case back wall by a second tab on a second side of the dividing wall.

In one form, opening the case cover utilizing a first hinge opens a first pocket of the multi-pocket assembly. Opening the case cover utilizing a second hinge opens a second pocket of the multi-pocket assembly.

In one form, the first and second pockets open in opposite directions.

In one form, the first and second pockets open 90 degrees apart.

In one form, the first tab acts to move contents out of the first pocket when the pocket is opened.

In one form, the tabs act to move a stored data card from a stored position to a presented position when the cover is opened.

In one form, the invention is directed to a case for a portable electronic device. The case has a back wall and a plurality of side walls for retaining the portable electronic device. The back wall includes a storage area. A cover is hingedly attached to the back wall to selectively cover the storage area. The storage area includes a grip for retaining edges of data cards.

In one form, the grip includes a plurality of protrusions creating gripping voids for receiving edges of data cards.

In one form, the grip includes a plurality of protrusions defining channels therebetween. The grip has a flexed state where the channels are wider than when the grip is in an unflexed state.

In one form, the case further includes a grip first end attached to the case back wall and a grip second end attached to a sliding actuator. The sliding actuator is also attached to the case cover.

In one form, opening the case cover causes the grip to transition from the relaxed state to the flexed state.

BRIEF DESCRIPTION OF THE DRAWINGS

FIG. 1 is a view of the electronic device encasement as seen from the back, with the cover closed.

FIG. 2 is a view of the electronic device encasement as seen from the back, with the cover open reveling the storage area.

FIG. 3A is a view of the electronic device encasement as seen from the back showing the storage feature in the open position, the storage feature including a plurality of pockets for receiving data cards.

FIG. 3B is a view of the electronic device encasement as seen from the back showing the storage feature in the open position, the storage feature including data cards inserted into a plurality of pockets.

FIG. 3C is a view of the electronic device encasement as seen from the back showing the storage feature in the open position, the storage feature including data cards being removed from a plurality of pockets FIG. 4A is a view of the electronic device encasement as seen from the back showing the storage feature in the open position with a gripping structure to receive edges of data cards.

FIG. 4B is a view of the electronic device encasement as seen from the back showing the storage feature in the open position with a gripping structure that has received a plurality of data cards.

FIG. 4C is a close-up view of the gripping feature in the relaxed or receiving state, receiving an edge of a data card.

FIG. 4D is a close-up view of the gripping feature in the stretched or securing state, securing an edge of a data card.

FIG. 5A is a view of the electronic device encasement as seen from the back with the cover closed. subfigures showing the storage feature in an embodiment which includes multiple access points with each access point allowing direct access to a given storage pocket which separates and presents each item when stored FIG. 5B is a view of the electronic device encasement as seen from the back with the cover open and hinged in a first position, allowing access to a first storage pocket.

FIG. 5C is a view of the electronic device encasement as seen from the back with the cover open and hinged in a second position, allowing access to a second storage pocket.

FIG. 5D is a view of the electronic device encasement as seen from the back with the cover open and hinged in a third position, allowing access to a third storage pocket.

FIG. 5E is a view of the electronic device encasement as seen from the back with the cover open and hinged in a fourth position, allowing access to a fourth storage pocket.

FIG. 5F is a view of the electronic device encasement as seen from the back with the cover removed showing the pocket structure in a folded configuration.

FIG. 5G is a cross-sectional view of the electronic device encasement showing the pocket structure in a folded configuration.

FIG. 5H is a cross-sectional view of the electronic device encasement showing the pocket structure in an open configuration.

DETAILED DESCRIPTION OF THE PREFERRED EMBODIMENT

Figure 6A:
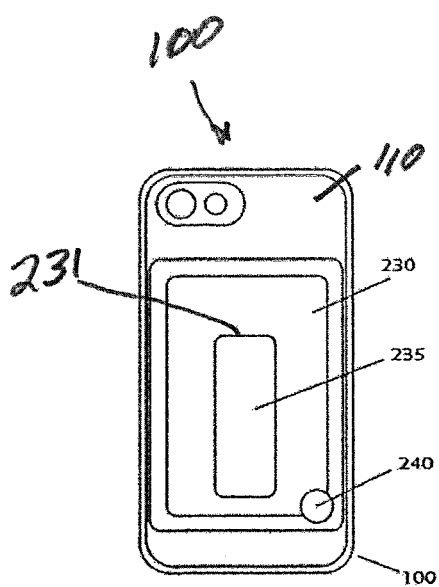
FIG. 6A is a view of the electronic device encasement as seen from the back, having a pivoting storage feature in the closed position.

With reference to the figures, FIG. 1 is an exemplary illustrative view of the electronic device encasement 100 as seen from the back. The encasement 100 is understood to be one that goes over and is supplemental to the encasement or case that encloses the electronics of the electronic device as provided by a commercial manufacturer. However, the added features described herein could be applied to the manufacturer's encasement. FIG. 1 also shows the storage feature in its closed position with the cover or lid 200 against the back wall 110 to contain the contents of the storage feature.

The encasement 100 includes a back wall 110 and sidewalls 120 which include holding details such as a slight undercut or lip on one or more of the sidewalls 120 to retain the electronic device (not shown) within the encasement 100 securely. The movably attached storage lid or cover 200 in the closed position in FIG. 1 and in an open position fore receiving or presenting contents in FIG. 2. The cover 200 is hingedly attached to the encasement 100 back wall 110 with a hinge 210. The hinge 210 can optionally have detent details which allow the storage cover 200 to be articulated in an optimal position or positions between fully open and fully closed. In such an embodiment, the cover 200 may be propped open as to create a kickstand like feature which allows the encased electronic device to be viewed at a range of angles when encasement 100 is place onto a surface.

FIG. 2 shows the movable attached storage cover 200 in the open position exposing storage area 410 having an opening 400 for receiving and presenting contents. Between storage opening 400 and encasement back wall 110, an optional gasket 405 is positioned in such a way as to create a protective seal when storage cover 200 is in the closed position as to not allow foreign unwanted objects or liquids from entering storage area 410. For instance, the gasket 405 makes sealing contact with the perimeter of the cover 200 and the back wall 110.

FIGS. 3A-C show the electronic device encasement 100 as seen from the back, including a storage feature for holding, separating, and presenting a plurality of stored data cards 500. The storage feature removably or permanently installed plurality of pockets constructed from a thin material such as a vinyl or PVC with an optional gripping texture or additive finish with a semi rigid dividers 310 and a folding side elements 320 connecting the dividers 310 and defining pockets similar to an accordion folder. Such connected dividers 310 can create at least a single pocket or optionally a series of pockets as shown. The pocket or divider 310 nearest storage cover 200 would be removably attached to the inner wall of cover 200 and the pocket or divider 310 nearest the backwall of the storage area, would have the divider 310 removably attached to the storage area's back wall in such a way that when storage cover 200 is unlatched and opened, the compressed pockets sequentially expand as to release its grip on the stored item or data card 500 and present the stored item, card or data card as shown in FIG. 3C, allowing easy access and removal of the presented stored item/card 500. Inversely, inserting the data card 500 to be stored easily into the expanded and decompressed pocket with the action of closing the storage lid 200 actuates the pockets to sequentially compress and close gripping the data card 500 stored within the pocket securely when closing and latching the storage cover 200.

FIGS. 4A-D show the electronic device encasement 100 as seen from the back showing the storage feature in the open position, the storage feature being an alternative embodiment including a rack or grip 300 to capture the edge of data cards 500. The grip 300 includes an open state for receiving and presenting stored data cards 500, and a gripping state for holding or griping stored data cards 500. FIG. 4B shows the gripping feature in its more relaxed grip state, separating and presenting the stored item such as a data cards 500. FIGS. 4C and 4D show a detailed view of how the alternative gripping mechanism is actuated, or how the grip 300 is flexed to open or close, thereby gripping or releasing the captured data cards 500.

FIG. 4A shows storage cover 200 in the open position which actuates the separating and presenting feature in the more relaxed grip state, with FIG. 4C showing in more detail how the feature is activated. In FIG. 4C, the alternative embodiment shows the grip 300 being an elastomeric component which can be molded or formed from a TPU or TPE or similar material. The grip 300 includes a plurality of finger like protrusions 340 creating a griping void/s 350 therebetween in which the stored item or data card 500 is easily released when the grip 300 is flexed, and easily captured or griped when the grip 300 is relaxed. The grip 300 is flexed by means of a sliding actuator 380 operably connected to the storage lid 200, such that the sliding actuator is actuated by the action of opening the storage lid 200. The further the storage lid 200 is opened, the more the sliding actuator 380 compresses the grip 300, which is anchored or fixed on the opposing side by hinge pin 365, forcing the grip 300 into an upward flexed position. This position allows the fingers or protrusions 340 to spread apart or to open and release their grip on the now presented and ready to remove stored item or data card 500. FIG. 4B shows the storage element or grip 300 fully loaded with a plurality of stored items such as a plurality of data cards 500. Subfigure 3D shows the inverse state whereas the stored item 500 has been inserted into the gripping void 350 and with the storage door 200 in the closed position, actuator 380 is in the non-actuation position which allows the elastomeric fingers to return to their gripping state firmly securing stored data cards 500.

FIGS. 5A-H show a view of the electronic device encasement 100 as seen from the back, the case including a storage feature having a cover 200 that is hinged to the case back 110 by a plurality of hinges. In the embodiment shown in FIGS. 5A-H, the cover is rectangular and has hinges located on at least two of the sides, preferably all four sides. This arrangement of hinges allow the cover 200 to be opened in four directions, allowing access to the storage area 410 and any contents, from four different sides. The embodiment shown includes a folded multi pocket assembly 350 having multiple access points which are configured as to be opened from at least two sides, and preferably four sides, or most preferably with a plurality of sides corresponding to the number of hinge directions of the cover 200, with each access point allowing direct access to a given storage pocket which separates and presents each card or purposefully grouped cards or stored items individually or in the subdivided groupings, in a manner that one can decide which card or stored items should be accessed and used in an as needed basis.

FIG. 5A shows the encasement 100 with the movably attaching and detaching storage cover 200 in the closed position. As shown in FIGS. 5A-H the movably attaching and detaching storage cover 200 has a plurality of open positions in which each stored item 500, 510, 520 and 530 is directly accessible in its released and presenting position for ease of removal from and or insertion for storage depending on which side of the storage cover 200 is accessed or which of a plurality of hinges 260-263 is utilized in opening the cover 200. The hinges 260-263 may be a snap fit retaining hinge. As shown in the figures, utilizing each of the hinges 260-263 allows access to a plurality of retaining pockets from different directions.

As shown in FIGS. 5F-H, the retaining pockets are defined and created by a resiliently folded presenting and dividing element or pocket assembly 380 which is attached to the back wall of cover 200 by tab 350, to allow the appropriate pocket to open when a particular hinge is utilized to open the cover 200. For instance, as shown in FIG. 5H, tab 350 is connected to cover 200, such that when hinge 260 is utilized, a pocket in the pocket assembly 380 is open to expose a data storage card 500. The pocket assembly 380 includes the main sub-divider 340 creating a retaining pocket for item 500. Tab 330 is a resiliently folded presenting and dividing element which is attached to the back wall 110 of the storage compartment 410 and to the main sub-divider 340 creating a retaining pocket for item 510, when attaching and detaching storage cover 210 is access from a particular side by releasing the appropriate hinge. Stored item 510 is released and presented by way of the resiliently folded element tab 330 straightening out thereby releasing and pushing stored item 510 from the stored position to the presented position making it easily removable and inversely easily inserted back into and held securely in its designated subdivided storage compartment or pocket. Similarly, one skilled in the art will recognize that tabs 381 and 382 can be attached to the cover 200 or case back wall 110 to open pockets in other directions, depending upon the hinge being used.

Figure 6B:
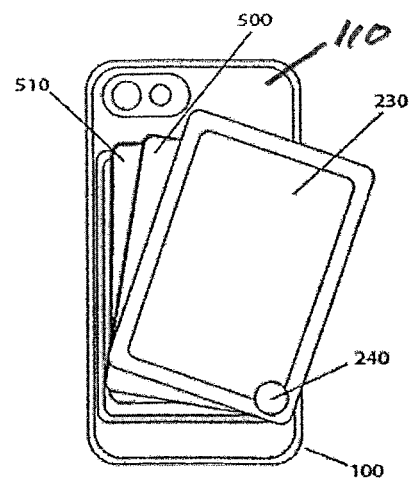
FIG. 6B is a view of the electronic device encasement as seen from the back, having a pivoting storage feature in the open position.

FIGS. 6A and B show an embodiment of the electronic device encasement 100 with a fanning of pivoting storage feature in the closed position and open position. FIG. 6B shows the feature holding, separating and presenting the stored data cards when the pivoting cover 230 is pivotably rotated by way of pivot member 240. The action of pivoting the storage cover 230 by way of the pivot member 240, a sequentially actuated feature then fans out the stored items in such a way as to release them from the stored and gripped position to the released and presented position as shown. The formerly stored item/s 500 and 510 are now easily removable from the separating and presenting element. The pivoting storage cover 230 can optionally include a subdivided axillary storage compartment 235 for storing small items which direct access and storage might be desirable. The axillary storage compartment 235 may include an axillary cover hingedly connected to the storage cover 230 at a hinge 23, allowing the storage cover for such axillary storage compartment 235 to act like a kickstand as to ensure a proper viewing angle for the encased electronic device when place onto a surface.

Figures 7A, 7B, 7C, 7D:
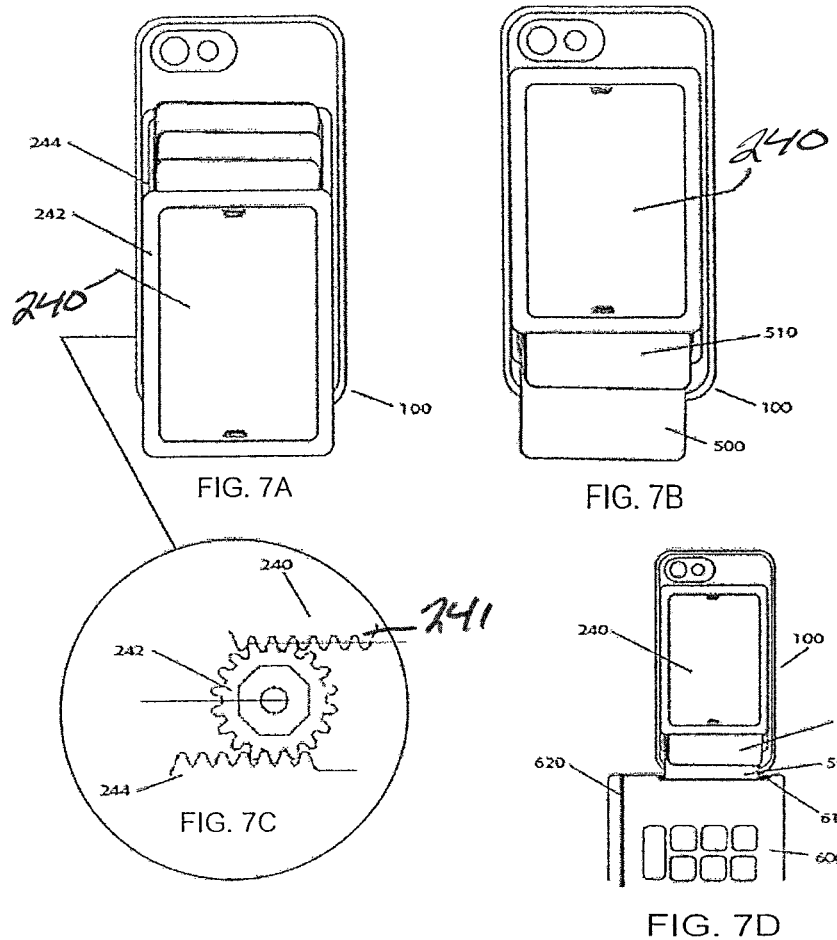
FIG. 7A is a view of the electronic device encasement as seen from the back with a sliding storage cover in a first open position, presenting stored data cards in a first direction.
FIG. 7B is a view of the electronic device encasement as seen from the back with a sliding storage cover in a second open position, presenting stored data cards in a second direction.
FIG. 7C is a close-up view of a double rack and pinion system to actuate the data card presenting element.
FIG. 7D is a view of the electronic device encasement as seen from the back with a sliding storage cover in an open position, presenting a stored data card for insertion into a card reading device.

An embodiment having a sliding storage lid or cover 240 is shown in FIGS. 7A-D. In such embodiment, the lid or cover 240 is slidably opened in opposite directions. The encasement 100 is seen from the back showing the storage feature in an open position by way of the movably attached and slidable storage cover 240. The assembly includes a storage element like those previously described, or a tray, pocket, or other structure to hold a single or plurality of data cards 510. The storage element may be connected to a rack and pinion mechanism to allow the sliding motion of opening the cover 240 to cause movement of the storage element in the opposite direction. The action of sliding the storage lid 240 with rack detail 241 incorporated or attached to the cover 240 causes rotating pinion gear 242 to rotate, which in actuates and optionally increasing the movement of the presenting and releasing element 244. Releasing element 244 may be incorporated into a storage element, or may be an element that engages, contacts, or otherwise pushes and presents the stored items 500 and 510 sequentially as to make it easy for the items to be removed from and inserted back into storage. FIG. 7D shows an alternative configuration in which the stored data cards 500 and 510 present themselves in a way that the primary card 500 can be inserted into a credit card machine 600 by way of insertion slot 610 or alternatively slide through scan slot 620 of the credit card machine without having to be totally removed from the storage compartment and or encasement 100.

The foregoing disclosure of specific embodiments is intended to be illustrative of the broad concepts comprehended by the invention.

The invention claimed is:

1. A case for a portable electronic device, the case including a back wall and a plurality of side walls for retaining the portable electronic device, the back wall including a storage area, a cover hingedly attached to the back wall to selectively cover the storage area, the cover attached to the back wall by a plurality of hinges, the hinges operating in different hinge planes, wherein the cover is rectangular having four perimeter sides, and including a hinge on each perimeter side.

2. The case of claim 1, wherein the hinges are snap fit retaining hinges.

3. A case for a portable electronic device, the case including a back wall and a plurality of side walls for retaining the portable electronic device, the back wall including a storage area, a cover hingedly attached to the back wall to selectively cover the storage area, the cover attached to the back wall by a plurality of hinges, the hinges operating in different hinge planes, wherein a multi-pocket assembly, the assembly including a dividing wall attached to the case cover by a first tab on a first side of the dividing wall, and attached to the case back wall by a second tab on a second side of the dividing wall.

4. A case for a portable electronic device, the case including a back wall and a plurality of side walls for retaining the portable electronic device, the back wall including a storage area, a cover hingedly attached to the back wall to selectively cover the storage area, the cover attached to the back wall by a plurality of hinges, the hinges operating in different hinge planes, wherein opening the case cover utilizing a first hinge opens a first pocket of the multi-pocket assembly, and opening the case cover utilizing a second hinge opens a second pocket of the multi-packet assembly.

5. The case of claim 4, wherein the first and second pockets open in opposite directions.

6. The case of claim 5 wherein the first and second pockets open 90 degrees apart.

7. The case of claim 6 wherein the first tab acts to move contents out of the first pocket when the pocket is opened.

8. The case of claim 7 wherein the tabs act to move a stored data card from a stored position to a presented position when the cover is opened.

* * * * *